May 10, 1938.  E. A. STULLER  2,116,745
BUCKLE STRUCTURE
Filed May 14, 1932
Fig. 1
Fig. 2
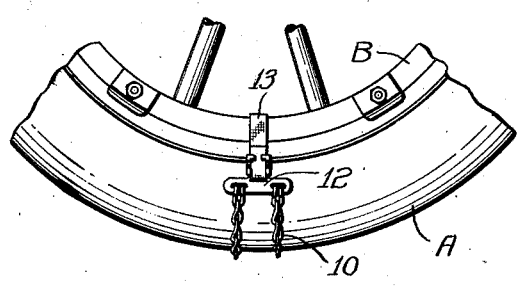
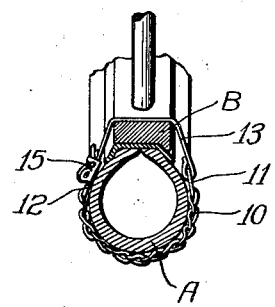
Fig. 4
Fig. 3
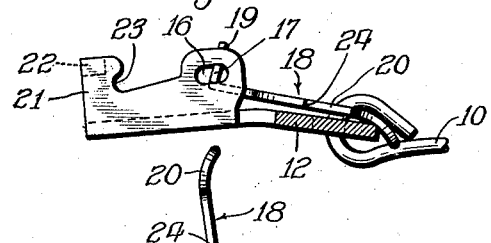
Fig. 5
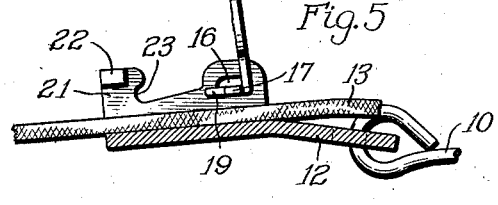
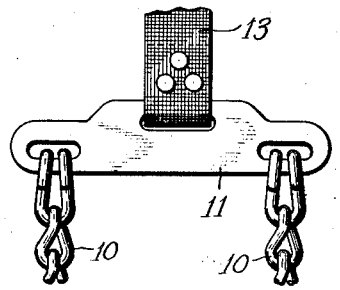
Fig. 6
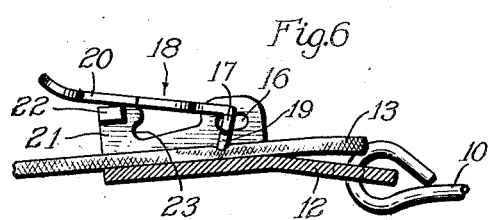
Fig. 7
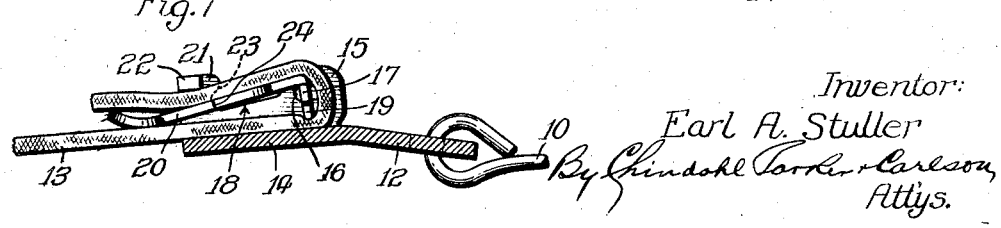
Inventor:
Earl A. Stuller
By Chindahl Torke & Carlson
Attys.

Patented May 10, 1938

2,116,745

UNITED STATES PATENT OFFICE 2,116,745

BUCKLE STRUCTURE

Earl A. Stuller, Chicago, Ill., assignor to Western Chain Products Co., Chicago, Ill., a corporation of Illinois Application May 14, 1932, Serial No. 611,250

19 Claims. (Cl. 24—193)

The invention relates generally to buckle structures and particularly to a structure which, while capable of use in many other environments, is especially well adapted for use in connection with tire chains of the type generally known as emergency chains wherein one or more of the chains are adapted to be secured to the wheel of a vehicle without moving the vehicle or raising the wheel. For convenience, the present invention will be described in association with such a tire chain.

A general object of the invention is provide a new and improved buckle structure which is sturdy, efficient in operation, is easy to manipulate, will produce a permanent and secure union between parts to be detachably connected, and which may be manufactured and sold at a low cost.

Another object is to provide, in an emergency tire chain, new and improved means for fastening the chain on the vehicle wheel which is simple and convenient to use and which cannot become accidentally disengaged.

A further object is to provide a fastening device for an emergency tire chain which secures the opposite ends of the chain together and utilizes the separating force occurring between the ends to interlock the parts securely together.

Another object more specifically stated is to provide a new and improved buckle structure embodying a channel-like base member supporting a lever which is journalled thereon by a pivot portion disposed in spaced relation to the base so that the end section of a strap may be passed through the channel between the base and pivot portion and then folded reversely to overlie said pivot portion, and means for frictionally engaging the reversely folded end section of the strap to resist escape of the strap from the buckle structure.

Another object is to provide a novel buckle structure especially adapted for emergency tire chain assemblies and embodying a sheet metal frame having an elongated part adapted for connection at its ends with road engaging cross chains, an integral intermediate wide portion supporting a strap engaging device, and integral means for further frictional engagement with the strap.

Other objects and advantages will become apparent in the following description and from the accompanying drawing, in which:

Figure 1 is a side elevation of a tire chain unit secured by a buckle embodying the invention in position on the wheel of a motor vehicle.

Fig. 2 is a transverse section through the wheel.

Fig. 3 is a fragmentary plan view of the device showing the buckle in open position.

Fig. 4 is a side elevation of the buckle.

Figs. 5, 6 and 7 are longitudinal sectional views through the buckle showing the parts in several different positions.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

With reference to the drawing wherein a buckle embodying the features of the invention is shown in connection with one form of tire chain device merely for the purpose of illustrating the invention, 10 designates a plurality of chains, or similar road-engaging members, which are dimensioned to fit about the outer part of a vehicle wheel, such as the tread portion of a tire A. At opposite ends, the chains are connected, in any conventional manner, with cross bars 11 and 12 which support the chains and space them apart circumferentially of the tire. Centrally, one of the cross bars, in this instance the bar 11, has an elongated flexible member 13, such as a woven fabric strap, secured thereto, the strap being of ample length to pass about the inner part of the tire A and rim B into overlapping relation to the other cross bar 12.

The cross bar 12 may be a sheet metal frame which carries a fastening device or buckle for engaging and holding the flexible member 13. To this end, the cross bar 12 has a wide portion located intermediate its ends, such as a plate 14, which is preferably integral with the cross bar and extends therefrom opposite the chains. The plate, along the longitudinal side edges, has outwardly extending integral ears or flanges 15 which, together with the plate 14, provide a channel for receiving the flexible member 13. The flanges 15 have alined apertures 16 formed in the ends thereof next to the cross bar 12 which are elongated, as shown in Fig. 4, substantially in parallelism with the plate 14. The apertures 16 receive transversely extending pivots 17 preferably fashioned as an integral part of a clamping device or latch member which is generally designated 18.

One preferred form of clamping device as shown herein comprises a bell crank lever having a short arm 19, adapted to engage the flexible member and bind it firmly against the plate, and a long arm 20 serving as a finger piece or actuator. The arrangement of parts is such that the long arm 20 swings away from the cross bar 12 into overlying relation to the plate 14 in moving the short arm into binding engagement with the flexible member.

The ends of the flanges remote from the cross bar have upward extensions 21 thereon which carry inwardly turned short lugs 22 spaced from the long arm 20 in the closed position thereof such a distance as will permit snug passage of the loose end of the flexible member therebetween. The extensions 21 have lateral recesses 23 fashioned therein and facing toward the apertured ends of the flanges. The long arm 20 of the lever may be enlarged or otherwise fashioned to provide transversely extending shoulders 24 (Fig. 3). The location of the shoulders is such that, when the pivots 17 are at the remote or more distant ends of the apertures 16, the shoulders will swing freely past the upper parts of the extensions into opposition to the recesses 23. Hence, if the pivots shift toward the other ends of the apertures, the shoulders will be moved into engagement with the walls of the recesses.

The operation of the device is as follows. The device is properly fitted about the tire and rim of the vehicle and the lever moved to the position shown in Fig. 5 to permit passage of the loose end of the flexible member through the space between the plate 14 and short arm 19. As shown in Figs. 5, 6 and 7 the direction of insertion is from the left hand end of the buckle, this end being the entrant side of the channel defined by the plate 14 and flanges 15. It should be noted that the pivots are flat with the long dimension thereof substantially equal to the width of the slot. This permits the lever to move perpendicularly to the plate to facilitate the insertion of the flexible member.

When the flexible member has been inserted and drawn taut, the pivots will be shifted toward the ends of the apertures remote from the recesses 23 as the lever is swung into the closed position thereof (see Fig. 7). Preferably, to facilitate movement of the shoulders 24 past the recess overlying portions of the extensions 21, the edges of such parts are arcuate as shown. Moreover, drawing on the end of the flexible member as the lever is closed will make the closing movement easier since the lever is arranged to exert a tightening pull on the stop as it is closed.

The lever having been closed, the loose end of the flexible member is turned upon itself about the lever pivot and passed beneath the lugs 22 as shown in Fig. 7. It will be evident that any strain or force tending to withdraw the flexible member from the lever or, in other words, any separating force exerted between the secured ends of the device, will shift the lever longitudinally of the channel and effect an interlocked engagement between the shoulders 24 and recesses 23. Obviously, the greater the separating pull, the more tightly will the parts become interlocked and the free end portion of the strap be gripped between the lever and the legs 22. In consequence, the buckle elements are positively held against accidental release and are, therefore, permanently secured until the operator disengages the interlock. This may be accomplished by first withdrawing the flexible member from beneath the lugs 22 and then shifting the lever laterally to permit release of the shoulders from the recesses. The interlock between the shoulders 24 and recesses 23 may be optionally used since the lever is so arranged that a separating pull on the strap will tend to swing the lever to its open position, thus frictionally gripping the reversely bent free end portion of the strap between the long arm of the lever and the overhanging lugs and providing a second engagement with the strap at a distance from the point of first engagement.

I claim as my invention:

1. A buckle comprising a plate having spaced outstanding members thereon defining a channel for receiving a portion of a flexible member, a bell crank lever pivoted on said members for movement therebetween and disposed in spaced relation to said plate thereby providing a passage through which said flexible member may be passed, said lever being movable about its pivot to bind the flexible member in said passage between one arm of the lever and the plate and to dispose the other arm of the lever substantially flatwise along the flexible member, said lever being also shiftable lengthwise along the plate, means spaced outwardly of the outer surface of the lever when said lever is in said flatwise position to provide a passage through which the end of the flexible member may be passed after said flexible member has been bent upon itself about said lever, said lever being shiftable under the influence of a working strain imposed on the flexible member, and an interlock between the lever and plate effected by said movement.

2. A buckle comprising a plate, an outstanding flange on each side of said plate arranged to receive a flexible member therebetween, said flanges having alined apertures therein elongated in a direction substantially paralleling the plate, a bell crank lever having lateral pivots mounted in said apertures, said lever being arranged to bind the flexible member against the plate by the short arm thereof as the long arm is moved toward the plate, laterally and inwardly extending lugs on said flanges under which the end of the flexible member may be passed when the lever is moved into binding engagement with said flexible member, hooks on said flanges, and hook engageable projections on said lever movable into engagement with the hooks by shifting movement of said pivots in said apertures as a separating pull is applied to said flexible member.

3. A buckle comprising a plate, a bell-crank lever pivotally mounted on the plate to primarily bind a flexible member against the plate, said member being subsequently shiftable lengthwise of the plate, and interlocking means on the plate and lever to effect an interlock between the plate and lever in consequence of said subsequent shifting movement of the lever to lock the parts against accidental disengagement.

4. A buckle comprising a plate, a bell-crank lever, means for mounting said lever on the plate for initial pivotal movement relative to the plate to bindingly engage a flexible member and for subsequent shifting movement lengthwise of the plate after said engagement is effected, and interlocking devices on said plate and lever to effect an interlock between the plate and lever in consequence of the shifting movement of said lever.

5. The combination with a flexible member of a buckle for fastening the end thereof, comprising a plate, a bellcrank locking lever pivoted upon the plate to primarily clamp said flexible member against the plate and around which the flexible member is bent to form a loop enclosing said lever, the lever and loop being also subsequently slidable lengthwise with respect to the plate, and interlocking means on said plate and lever to interlock said lever and plate by said sliding movement incident to pull on the loop.

6. A buckle comprising a base plate, a clamp-lever between which and said base plate a strap may be inserted, said lever being provided with a cam-engaging shoulder; means for pivotally and slidably connecting said lever to said base plate whereby it may be moved into strap-clamping position and thereafter shifted longitudinally of itself, including a pair of ears projecting from said base plate and provided with elongated openings and further including bearing elements projecting from said lever and confined within said openings; a lever-engaging cam, carried by one of said ears, over which cam said cam-engaging shoulder is adapted to pass as said lever is moved about its pivotal connection with said ears to strap-clamping position and into lever-locking engagement with which said shoulder is adapted to pass as said lever is shifted longitudinally of itself; and a pair of lugs carried by said ears and adapted to function as a keeper between which and said lever the free end of the strap may be passed in a superimposed relation to said lever pursuant to the establishing of said lever-locking engagement.

7. In a buckle of the character described, a frame having a base for supporting the adjacent portion of a strap, a cam lever pivoted to the frame for clamping and releasing the strap upon and from the base as the lever is rocked in reverse directions, the end of said strap being adapted to be returned along the outer face of the free end of the lever while the latter is in its clamping position to prevent release of the lever, and means on the frame rigid therewith for engaging and holding the returned end of the strap in its returned position and thereby to hold the lever in its clamping position.

8. In a buckle of the character described, a frame having a base for supporting the adjacent portion of a strap, a cam lever journaled on the frame to swing into and out of engagement with the adjacent portion of the strap for clamping and releasing the same upon and from the base as the cam is rocked in reverse directions, said cam having an operating handle extending toward the entrant end of the buckle, the free end of the clamped strap being adapted to be returned over and upon the handle of the lever, and lugs on the frame overhanging the returned end of the strap for holding the lever in its clamping position.

9. In a buckle of the character described, a frame having a strap-supporting base and laterally spaced lugs overhanging the base, and a cam lever mounted on the frame and movable through the space between the lugs toward and from the base for clamping and releasing the strap upon and from said base as the lever is rocked in reverse directions, the free end of the clamped strap being adapted to be inserted under the lugs and along the outer face of the lever when the latter is in its clamping position for holding said lever in that position.

10. A strap securing device comprising a base, movable means provided on said base for gripping said strap and holding it against withdrawal from said base, and means for causing the free end of said strap to retain said means in gripping position.

11. A strap securing device comprising a base, a movable member provided on said base for gripping and forcing said strap into frictional engagement with said base, and means for selectively locking said movable member in gripping position.

12. In a strap locking device, a base member, a lever mounted for rocking movement upon said base member, said lever being operable to grip said strap and restrain it against withdrawal from said base when it is disposed in a locking position, and to allow said strap to be freely withdrawn when it is disposed in a release position, and means for causing said strap to bear against said lever and positively maintain said lever in locking position when the latter is disposed in locking position.

13. The device described in the preceding claim, wherein said lever is operable to clamp said strap between it and said base member when it is disposed in locking position.

14. The device described in the claim preceding the one above, wherein said strap cooperates with one end of said lever and is operable to restrain the same against movement away from said base when said strap is engaged with said means.

15. A strap-securing device of the character described comprising a base having a pair of upstanding ears to provide a strap-receiving channel, a lever having a pivot portion journaled in said ears in a plane spaced from the base, a strap having a free end portion adapted to be passed from one end of the device through said channel beneath said pivot portion and then folded reversely to pass over said pivot portion, and means extending crosswise of said channel in overlying relation to the reversely-folded portion and in a position spaced from said pivot portion in the direction of the entrant end of the device, said means coacting with said lever to frictionally grip said reversely-folded portion of the strap and thereby resist escape of the strap from the device.

16. A buckle assembly for a tire chain unit having, in combination, a frame formed from an integral piece of sheet metal and comprising an elongated plate adapted for attachment at its ends to a pair of road-engaging cross chains, said plate having an integral wide mid-portion, and said mid-portion having integral outturned ears spaced apart to receive a flexible strap between them, a device pivotally mounted on said ears and arranged when in one position to permit the free passage of a strap into securing position, and when in another position to have a frictional binding engagement with a strap so positioned, said frame further having integral means thereon to engage the free end of the strap at a distance from said point of engagement.

17. A strap-securing buckle comprising a base, a movable device mounted on said base for frictionally gripping at one point a strap passed therethrough, and means acting upon the strap when its free end is bent back upon itself for frictionally gripping such bent-back portion at a second point spaced from the first-mentioned point.

18. In a buckle structure for cooperative association with a flexible strap, the combination of a channel-shaped member defined by a base and outstanding ears at the sides of the base, clamping means pivoted to said ears and arranged for swinging movement in one direction to clamp a flexible strap and hold it securely to said member and in an opposite direction to release said strap, the direction of entry of said strap into the channel for engagement by said lever being such that the clamping movement of said lever exerts a pull on the strap to tighten it about an object and a separating pull on said strap moves the lever in a strap releasing direction, and means on said member for engagement with the reversely-bent free end of the strap to hold it in closely overlying relation to said lever and prevent such releasing movement thereof.

19. In a buckle construction for cooperative association with a strap, the combination of a base, a clamping lever pivotally mounted on said base including strap engaging means adjacent to the pivotal axis of the lever arranged when the lever is swung away from the base to provide a substantial opening for ready insertion and withdrawal of the strap and when the lever is swung to extend along the base to have a frictional binding engagement with the strap, and a fixed part on the base adjacent the lever at a distance from said pivotal axis and between which part and the lever the reversely turned free end of the strap may be passed, the relationship of the strap and lever being such that movement of the lever by a separating pull exerted by the strap binds a portion of the reversed end of the strap more firmly between the lever and said fixed part whereby the strap is frictionally secured by the lever at two spaced points.

EARL A. STULLER.